March 31, 1964 J. PENRAAT ETAL 3,126,646
AUDIO-VISUAL TEACHING MACHINE
Filed Nov. 14, 1961
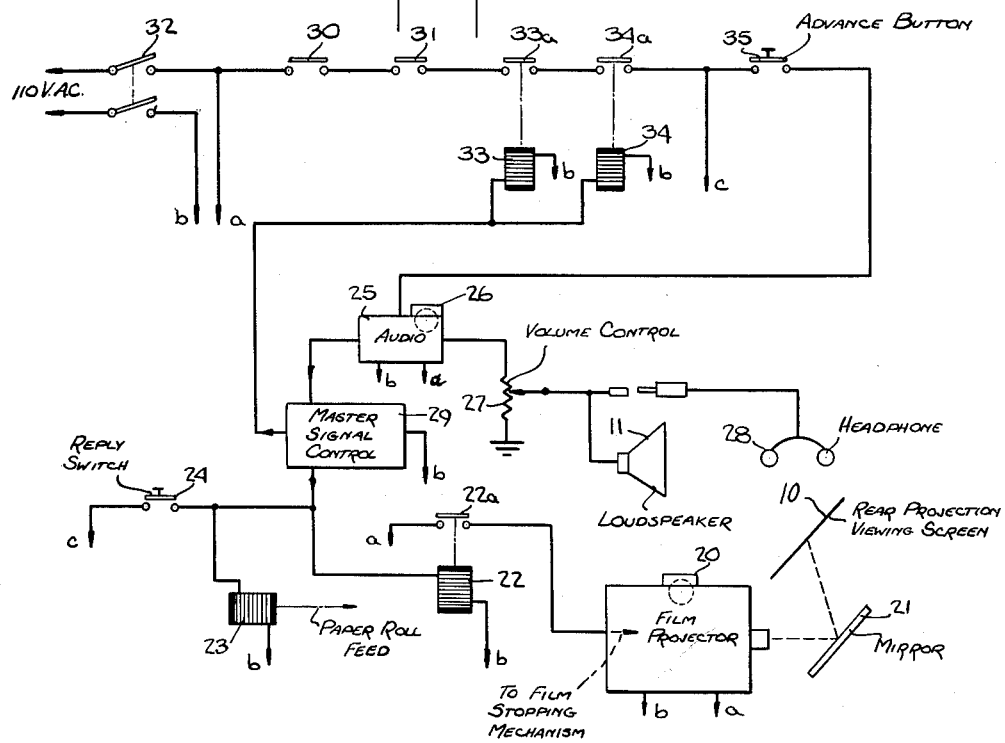
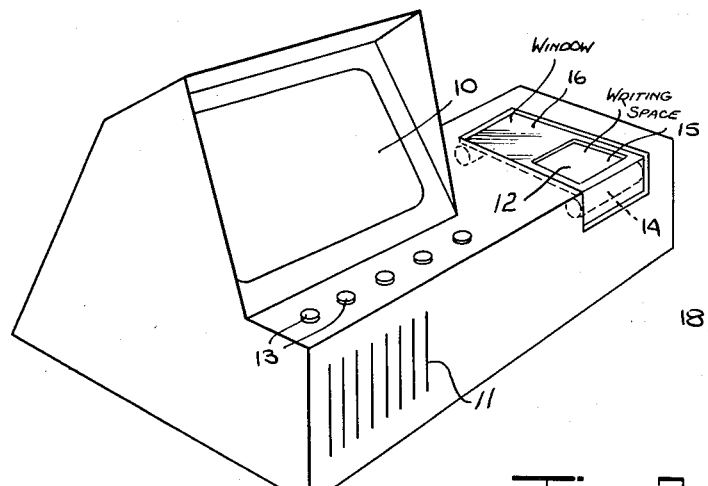
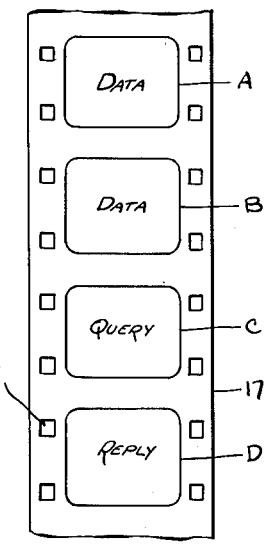
INVENTOR.
JAAP PENRAAT
WALLACE C. VOGT
BY
*Michael Ebert*
ATTORNEY United States Patent Office — 3,126,646 — Patented Mar. 31, 1964

3,126,646
AUDIO-VISUAL TEACHING MACHINE
Jaap Penraat, New York, N.Y., and Wallace C. Vogt, Upper Saddle River, N.J., assignors to Jaap Penraat Associates, Inc., New York, N.Y., a corporation of New York
Filed Nov. 14, 1961, Ser. No. 152,185
5 Claims. (Cl. 35—9)

This invention relates generally to audio-visual teaching machines, and more particularly to machines in which the visual presentation is coordinated both with an oral explanation and the responsive actions or replies of a student operator.

In recent years, teaching machines have been developed to meet the severe demands imposed on the educational system by a rising school population and the increasing complexity of subject matter to be taught. Such machines usually take the form of a slide projector whose operation is synchronized with a sound reproducing device so that each slide is accompanied by an appropriate spoken commentary.

The conventional audio-visual machine, while fairly effective before a class of students, does not lend itself to individual instruction, for it cannot by its very nature invite student participation nor can it adjust itself to the abilities, limitations and personal needs of particular students.

Effective teaching requires not only the exposition of instructive material but the continuing examination of the student to test his degree of absorption. This interplay between instructor and student is altogether lacking in ordinary machines. Thus the student is reduced to the role of a passive spectator rather than an active participant in the teaching process and the machine is a poor substitute for the living teacher.

Accordingly, it is the major object of this invention to provide a teaching machine which is subject to the control of the individual student and which acts not only to present subject matter in effective visual and audio form but also to interrogate the student and compare his responses with correct answers.

More specifically, the object of this invention is to provide a machine which, when actuated by the student, projects one or more slides accompanied by a spoken narrative, at the conclusion of which related questions are posed, the operation being arrested until such time as the student has written his answers. Then upon actuation of the machine by the student, the correct answer is projected for comparison with the written answer, after which the process is repeated.

A significant feature of the invention is that it facilitates a novel programmed teaching technique in which difficult subject matter may be analyzed or broken down into digestible units or readily absorbed modules. By presenting one unit at a time and examining the student thereon before the next unit is projected, it is possible to afford systematic and effective instruction at a pace adjusted to the ability of the individual student. Otherwise stated, the programmed technique acts to reduce the substance of a lesson to elementary units which are separately mastered by the student until the substance of the lesson is reassembled and absorbed.

It is also an object of the invention to provide an audio-visual machine of the above-described type which is efficient and reliable in operation and which may be manufactured and sold at low cost.

A further object of the invention is to provide a machine which is of simple and compact design so that it need not occupy more room than a student desk, and in fact may also serve as a desk.

Briefly stated these objects are attained in a machine comprising a film projector adapted to operate in a step-wise manner to project a series of individual frames or slides, the operation being coordinated with a sound reproducer so that when the student presses an "advance" button, one or more slides are presented accompanied by appropriate oral instructions, the last slide or the sound commentary posing questions relating to the slides previously shown.

An answering slate or paper roll is provided upon which the student writes his answers, and when this is done, the student presses a "reply" button to shift the answers under a display window and at the same time to cause the projector to present a pro forma reply to the questions. After the student has had an opportunity to compare the two sets of answers, he again presses the "advance" button and the process is repeated for the next unit of subject matter. This operation is continued until the lesson is completed.

Thus each roll or cartridge of film and the accompanying sound record or tape constitute a succession of instructive units which together form a complete lesson or packaged course of instruction. Obviously, a library of such courses may be provided with each machine.

For a better understanding of the invention, as well as other objects and further features thereof, reference is made to the following detailed description to be read in conjunction with the accompanying drawing, wherein:
FIG. 1 is a perspective view of an audio-visual teaching machine console in accordance with the invention.
FIG. 2 is a sample of the film strip used in the machine.
FIG. 3 is a schematic diagram of the machine components.

Referring now to the drawings and in particular to FIG. 1, the console of the machine is illustrated, comprising a film projector viewing screen 10, a loud speaker 11, a writing tablet 12 and control knobs 13. The writing tablet preferably takes the form of a paper web 14 which is unwound from a supply roll onto a motor-driven take up roll, the web being exposed for writing through a rectangular frame 15, the written answers then being shifted under a display window 16.

Projected onto screen 10 in a step by step manner are slides contained in successive frames on a continuous film wound within a magazine insertable into the projector. A sample of the film 17 is shown in FIG. 2, the film containing sprocket holes 18 and a sequence of frames A, B, C and D. Frames A, B, C and D constitute a single unit of instruction, frames A and B being data frames containing subject matter to be taught, frame C being a query frame asking questions as to the material presented and frame D being the correct reply.

It is to be understood that each unit may consist of a single picture or data frame and a single question frame or for that matter any number of data frames followed by the question and answer frames. It is also to be understood that in lieu of a separate reply or answer frame, the answers may be contained along the edge of the question frame, the answers being normally blocked by a masking plate which is removed by electromagnetic means or other known expedients when the reply button is pressed.

The sound record may take the form of a magnetic tape cartridge insertable in a tape reproducer, so that when the student presses the advance button he can simultaneously hear a narrator express information concerning the pictures or data appearing on the screen. Of course phonograph discs may be used in place of magnetic tape. In addition to the audio signals on the tape or record, there are recorded control signals or pulses, preferably in the supersonic range, which may be segregated and picked up by a suitable high-pass filter to carry out the various control functions of the system. The control signals act to govern the stepping action of the film projector so that appropriate slides are projected coordinately with the oral commentary. On a single track tape the control signals may be superimposed on the audio, but on a double track tape a separate channel may be used, eliminating the need to separate the control signals.

Referring now to FIG. 3, the components of the system are shown, the film projector being represented by numeral 19 and the film cartridge by 20. The slides are cast on screen 10 through a reflecting mirror 21. The frames or slides are advanced, frame by frame, by a suitable stepping mechanism controlled by switch 22a actuated by a stepping relay 22.

The paper roll feed mechanism is controlled by a solenoid 23 operated through a "reply" switch 24, such that when switch 24 is closed the paper will be advanced from the writing frame to the display glass (FIG. 1). At the same time actuation of switch 24 simultaneously energizes the stepping relay 22 to advance one slide in the projector 19.

The audio reproducer 25 operates in conjunction with a magnetic tape cartridge 26, the output of the reproducer being fed through a volume control 27 to loudspeaker 11 or alternatively to a headset 28. The control pulses extracted from the sound track are applied to a master signal control device 29 which provides actuating signals to the film stepping mechanism. The control device, for example, may be constituted by a pulse-triggered one-shot multivibrator operating an output relay to carry out a switching action.

In normal operation, the student inserts the cartridges or magazines 20 and 26 into appropriate receptacles and closes the panel doors on the film projector and tape reproducers, thereby closing interlock switches 30 and 31.

When power switch 32 is closed, power from an A.-C. source is supplied through lines a and b to energize the projector lamp, the amplifier unit of the tape reproducer 25 and relays 33 and 34 (film magazine door lock and audio magazine door lock), to close switches 33a and 34a, respectively. These relays are energized during the entire operation to prevent premature removal of the magazines prior to completion of the entire program.

When the student presses the advance button 35, the tape 26 is driven, this being accomplished for example by means of a suitable clutch mechanism actuated by closure of switch 35. It will be noted that the series chain of switch 32, 30, 31, 33a and 34a is already closed to apply power when switch 35 is closed.

With the operation of the second tape the control signals derived therefrom act through the master control 29 to operate film stepping relay 22 and to present a succession of slides coordinately with the sound narration. That is, the first slide remains projected until the narration relative thereto is completed, at which point a control signal causes relay 22 to close switch 22a to cause the film to step to the second slide and so on.

Upon completion of the audio portion, the final picture in the bracket of slides forming the unit remains on the screen, the final picture consisting of a query that must be replied to by the student on the paper roll.

After the student has finished writing his reply, he pushes button 24, energizing solenoid 23 to advance the paper roll and bring the written reply under the viewing glass, and to actuate stepping relay 22 to step the film to show the reply slide so that the student can check his response.

The student is now ready for the next unit of instruction and he presses the advance button 35 for repeating the operation described above. At the completion of the entire lesson, a signal from master control deenergizes relays 33 and 34, permitting removal of the magazines.

While there has been shown what is considered to be a preferred embodiment of the invention, it is to be understood that many changes and modifications may be made therein without departing from the spirit of the invention as set forth in the annexed claims. Thus, in lieu of a sound system, all control signals may appear on the film itself in the form of notches or contacts which may be sensed mechanically, optically or electrically to control the movement of the projector. Also, in place of the sound system, the device may be entirely visual with a manual control to step from slide to slide, and a manual control to remove a slide plate exposing answers to questions which answers appear in a section of the fiber frame adjacent the questions.

What is claimed is:

1. A teaching device comprising a projector for presenting a film containing a succession of instructive units each of which is constituted by a series of information slides, the next to the last slide in each series containing questions and the final slide containing answers thereto, a sound reproducer having a sound track carrying a succession of narrations appropriate to the series of slides in each of the corresponding instructive units and including control signals, a control system responsive to said signals to cause the step-wise presentation of the slides in each of said series and to arrest said presentation and said sound track when said question slide is presented, and means responsive to a student action to cause said film to step to said answering slide.

2. A teaching device comprising a projector for presenting a film containing a succession of instruction units each of which is constituted by a series of slides, the next to the last slide in each series containing questions and the final slide containing answers thereto, a sound reproducer having a sound track carrying a succession of narrations appropriate to the corresponding instructive units and including control signals, a control system responsive to said signals to cause the step-wise presentation of the slides in said series and to arrest said presentation and said sound track when said question slide is presented, continuous paper means for writing answers to said questions, and means responsive to a student action to cause said film to step to said answering slide and simultaneously to advance said paper means.

3. A teaching device comprising means to present images on a screen, which images are constituted by a succession of instruction units, each unit of which is formed by a series of slides the next to the last of which contains questions and the final one of which contains answers thereto, means to reproduce a sound recording to accompany said slides, said recording including control signals, means responsive to said signals to control the presentation of said slides, means to initiate the operation of said reproducing means whereby upon the presentation of a question slide, said presentation means and said reproducing means are arrested by a control signal, paper means to write responses to the question presented, and means simultaneously to shift said paper means with the written answers thereon to a display position and to cause said presentation means to present said answer slide.

4. A teaching device comprising means to present images on a screen which images are constituted by a succession of instructive units, each unit of which is formed by a series of slides the next to the last of which contains questions and the final one of which contains answers thereto, magnetic tape means to reproduce a sound recording to accompany said slides, said recording including control signals, means coupled to said tape reproducing means and reponsive to said signals to control the presentation of said slides, means to initiate the operation of said tape reproducing means whereby upon the presentation of a question slide, said presentation means and said reproducing means are arrested, paper means to write responses to the questions presented, and means simultaneously to shift said paper means with the written answers thereon to a display position and to cause said presentation means to present said answer slide.

5. An audio-visual teaching device comprising a projector to present slides on a screen, said slides being contained on a continuous film and being constituted by a succession of instruction units, each unit of which is formed by a series of slides the next to the last of which contains questions and the final of which contains answers thereto, a tape reproducer to reproduce a sound recording to accompany said slides, said recording including control signals, means responsive to said signals to control the presentation of said slides, advance switch means under student control to initiate the operation of said reproducer whereby upon the presentation of a question slide, said presentation means and said reproducing means are arrested, a motor driven continuous paper device to write responses to the questions presented, and reply switch means under student control simultaneously to shift said paper with the written answers thereon to a display position and to cause said presentation means to present said answer slide.

References Cited in the file of this patent

UNITED STATES PATENTS

| | | |
|---|---|---|
| 2,985,069 | Sampson | May 23, 1961 |
| 2,987,828 | Skinner | June 13, 1961 |